United States Patent
Mohanty et al.

(10) Patent No.: US 11,328,707 B2
(45) Date of Patent: May 10, 2022

(54) BUILDING A KNOWLEDGE BASE TAXONOMY FROM STRUCTURED OR UNSTRUCTURED COMPUTER TEXT FOR USE IN AUTOMATED USER INTERACTIONS

(71) Applicant: FMR LLC, Boston, MA (US)

(72) Inventors: Pranab Mohanty, Boston, MA (US); Bianca De Oliveira Pereira, Galway (IE); Cecile Robin, Galway (IE); Tobias Daudert, Galway (IE); John McCrae, Galway (IE); Paul Buitelaar, Galway (IE)

(73) Assignee: FMR LLC, Boston, MA (US)

( * ) Notice: Subject to any disclaimer, the term of this patent is extended or adjusted under 35 U.S.C. 154(b) by 201 days.

(21) Appl. No.: 16/871,865

(22) Filed: May 11, 2020

(65) Prior Publication Data

US 2020/0395001 A1 Dec. 17, 2020

Related U.S. Application Data

(60) Provisional application No. 62/846,305, filed on May 10, 2019.

(51) Int. Cl.
*G06F 40/00* (2020.01)
*G10L 15/02* (2006.01)
*G06F 16/36* (2019.01)
*G10L 15/30* (2013.01)
*G10L 15/26* (2006.01)
*G06F 16/33* (2019.01)
*G06F 40/30* (2020.01)
*G06F 40/211* (2020.01)
*G06F 40/284* (2020.01)

(52) U.S. Cl.
CPC .......... *G10L 15/02* (2013.01); *G06F 16/3344* (2019.01); *G06F 16/36* (2019.01); *G06F 40/30* (2020.01); *G10L 15/26* (2013.01); *G10L 15/30* (2013.01); *G06F 40/211* (2020.01); *G06F 40/284* (2020.01)

(58) Field of Classification Search
CPC combination set(s) only.
See application file for complete search history.

*Primary Examiner* — Vu B Hang
(74) *Attorney, Agent, or Firm* — Proskauer Rose LLP

(57) ABSTRACT

Methods and apparatuses are described for building a knowledge base taxonomy from structured or unstructured computer text for use in automated user interactions. A server computing device receives one or more of structured text or unstructured text corresponding to historical user interaction data from a database. The server computing device extracts one or more terms from the received text that are most relevant to a subject matter domain. The server computing device organizes the extracted one or more terms into a taxonomy data structure.

21 Claims, 9 Drawing Sheets

Table 1

| Experiment | n-gram | | Scoring Function | | | | Ranking |
|---|---|---|---|---|---|---|---|
| | Min | Max | Frequency | Context | Reference Corpora | Topic Modelling | |
| TE baseline | 1 | 4 | tf-idf | - | - | - | Single |
| TE baseline long | 2 | 4 | tf-idf | - | - | - | Single |
| $TE_1$ | 1 | 4 | tf-idf Residual Idf C Value ComboBasic | - | Weirdness | - | Voting |
| $TE_1$ long | 2 | 4 | tf-idf Residual Idf C Value ComboBasic | - | Weirdness | - | Voting |
| $TE_2$ | 1 | 4 | ComboBasic | - | - | - | Single |
| $TE_2$ long | 2 | 4 | ComboBasic | - | - | - | Single |
| $TE_3$ long | 2 | 4 | ComboBasic | - | Relevance | - | Voting |
| $TE_4$ | 1 | 4 | - | PostRankDC | - | - | Single |
| $TE_4$ long | 2 | 4 | - | PostRankDC | - | - | Single |
| $TE_5$ | 1 | 4 | - | - | - | NTM | Single |
| $TE_5$ long | 2 | 4 | - | - | - | NTM | Single |

FIG. 5

Table 2

| Experiment | Coverage (%) | Precision (%) |
|---|---|---|
| TE baseline | 36 | 48.6 |
| TE baseline long | 38.5 | 59.7 |
| $TE_1$ | 47 | 50.0 |
| $TE_1$ long | 41.5 | 59.0 |
| $TE_2$ | 30.5 | 54.1 |
| $TE_2$ long | 37.5 | 65.3 |
| $TE_3$ long | 37.5 | 65.3 |
| $TE_4$ | 45 | 56.7 |
| $TE_4$ long | 30.5 | 62.3 |
| $TE_5$ | 21.5 | 30.2 |
| $TE_5$ long | 21.5 | 30.2 |

FIG. 6

Table 3

| Search | Likelihood Score | | |
|---|---|---|---|
| | Transitive | Non-Transitive | Bhattacharyya-Poisson |
| Greedy | $TA_1$ | $TA_2$ | $TA_3$ |
| Beam | $TA_4$ | $TA_5$ | $TA_6$ |

FIG. 7

Table 4

| Search Method | Likelihood Score Function | Out-of-Domain Model | | | In-domain Model | | |
|---|---|---|---|---|---|---|---|
| | | Products | Sectors | Topics | Products | Sectors | Topics |
| Greedy | Transitive | 16.86 | 11.25 | 11.41 | 7.28 | 8.75 | 7.38 |
| | Non-Transitive | 17.62 | 12.50 | 11.41 | 21.84 | 15.00 | 13.42 |
| | BP | 17.62 | 12.50 | 12.08 | 22.22 | 16.25 | 13.42 |
| Beam | Transitive | 4.21 | 1.25 | 1.34 | 3.83 | 1.25 | 0.67 |
| | Non-Transitive | 16.86 | 11.25 | 10.74 | 16.48 | 8.75 | 8.72 |
| | BP | 18.01 | 12.50 | 10.74 | 15.33 | 8.75 | 9.40 |

FIG. 8

BUILDING A KNOWLEDGE BASE TAXONOMY FROM STRUCTURED OR UNSTRUCTURED COMPUTER TEXT FOR USE IN AUTOMATED USER INTERACTIONS

RELATED APPLICATIONS

This application claims priority to U.S. Provisional Patent Application No. 62/846,305, filed on May 10, 2019, the entirety of which is incorporated herein by reference.

TECHNICAL FIELD

This application relates generally to methods and apparatuses, including computer program products, for building a knowledge base taxonomy from structured or unstructured computer text for use in automated user interactions.

BACKGROUND

Customer service agents play an important role in bridging the gap between customers' vocabulary and business terms. Agents are charged with the role of identifying the intention behind customer questions, retrieving the relevant business information that address those queries, and expressing it in a form that the customer is able to understand. However, the increasing demand for customer services and the necessity to scale up a human workforce are an ongoing challenge for businesses. To address that, organizations are turning to automatic or semi-automatic customer service through the use of digital conversational agents (also referred to as chatbots) for primary contact with customers, leaving human agents to deal mostly with unusual or more complex customer queries.

The primary challenges faced by digital conversational agents are: the acquisition of domain knowledge, and knowledge representation that can be audited by the business. Whereas human agents may pass through training programs to understand the business they are working with, conversational agents not only need to acquire knowledge about the business but also about the way customers express their informational needs. Further, while it is expected that human agents would be responsible for the provision of the correct information needed by the customer, digital conversational agents cannot be held legally responsible. Instead, businesses need to have a means to audit the knowledge being used by these digital agents in order to minimize the error in the retrieval of information. Therefore, digital conversational agents need to make use of knowledge representation mechanisms that are applicable to their tasks but also interpretable by humans.

As such, conversational agents need to have domain-specific knowledge in order to be effective interfaces for human-computer interaction. Most attempts to represent such knowledge have been based on extracting information directly from textual sources, such as online discussion forums (see, e.g., Huang, J., Zhou, M., Yang, D.: *Extracting chatbot knowledge from online discussion forums*, In: IJCAI. vol. 7, pp. 423-428 (2007)). However, it has been identified that a structured form of knowledge can provide a useful intermediate step, for example as described in Sanchez-Diaz, X., Ayala-Bastidas, G., Fonseca-Ortiz, P., Garrido, L.: *A knowledge-based methodology for building a conversational chatbot as an intelligent tutor*, In: Mexican International Conference on Artificial Intelligence. pp. 165-175. Springer (2018), which used a logical representation to apply chatbots as intelligent tutors. Furthermore, Semantic Web representations may be applicable, as has been shown by the use of manually designed ontologies in the chatbot process such as in the OntBot system (Al-Zubaide, H., Issa, A. A.: Ontbot: *Ontology based chatbot*, In: International Symposium on Innovations in Information and Communications Technology. pp. 7-12. IEEE (2011)) and the development of chatbots based on large knowledge graphs such as the DBpedia bot (Athreya, R. G., Ngonga Ngomo, A. C., Usbeck, R.: *Enhancing community interactions with data-driven chatbots—the DBpedia chatbot*, In: Companion of the The Web Conference 2018 on The Web Conference 2018. pp. 143-146. International World Wide Web Conferences Steering Committee (2018)). A more complete survey of the area is described in Abdul-Kader, S. A., Woods, J.: *Survey on chatbot design techniques in speech conversation systems*, International Journal of Advanced Computer Science and Applications 6(7) (2015).

SUMMARY

Therefore, what is needed are methods and systems for the automatic generation of taxonomies from unstructured text containing customer service dialogue data that can then be applied to automated user interactions to provide more accurate and efficient interaction sessions. The goal is to take advantage of existing dialogues between customers and agents as learning data about the domain, and to use taxonomies as semantic structures for auditing the knowledge used by a conversational agent. In some embodiments, the technology described herein is applied in a financial customer service use case involving a multi-channel customer interaction paradigm—including not only chatbot-based customer interaction sessions but also content classification and recommendation systems.

The invention, in one aspect, features a system for building a knowledge base taxonomy from structured or unstructured computer text for use in automated user interactions. The system includes a server computing device comprising a memory for storing programmatic instructions and a processor that executes the programmatic instructions. An automated conversational agent of the server computing device establishes a communication session with a client computing device. The automated conversational agent captures one or more text segments corresponding to messages exchanged between the automated conversational agent and the client computing device in the communication session. The automated conversational agent stores the captured text segments in a database. A taxonomy generation module of the server computing device receives one or more of structured text or unstructured text corresponding to historical user interaction data, including the captured text segments, from the database. The taxonomy generation module extracts terms from the received text that are most relevant to a subject matter domain. The taxonomy generation module organizes the extracted terms into a taxonomy data structure. The taxonomy generation module provides the taxonomy data structure to the automated conversational agent. The automated conversational agent generates one or more responses, using the taxonomy data structure, to messages received from the client computing device.

The invention, in another aspect, features a computerized method of building a knowledge base taxonomy from structured or unstructured computer text for use in automated user interactions. An automated conversational agent of a server computing device establishes a communication session with a client computing device. The automated conversational agent captures one or more text segments corresponding to messages exchanged between the automated conversational agent and the client computing device in the communication session. The automated conversational agent stores the captured text segments in a database. A taxonomy generation module of the server computing device receives one or more of structured text or unstructured text corresponding to historical user interaction data, including the captured text segments, from the database. The taxonomy generation module extracts terms from the received text that are most relevant to a subject matter domain. The taxonomy generation module organizes the extracted terms into a taxonomy data structure. The taxonomy generation module provides the taxonomy data structure to the automated conversational agent. The automated conversational agent generates one or more responses, using the taxonomy data structure, to messages received from the client computing device.

Any of the above aspects can include one or more of the following features. In some embodiments, extracting terms from the received text that are most relevant to a subject matter domain comprises: identifying candidate terms in the received text; generating a score value for each of the identified candidate terms; ranking the candidate terms according to the score values; filtering the ranked candidate terms; and extracting the filtered candidate terms from the received text. In some embodiments, identifying candidate terms in the received text comprises detecting a plurality of noun phrases in the received text that have one or more of the following characteristics: contain a minimum number of n-grams, contain a maximum number of n-grams, do not start with a stopword, do not end with a stopword, follow a part-of-speech pattern, and occur at least a minimum number of times within the received text. In some embodiments, generating a score value for each of the identified candidate terms comprises applying one or more scoring functions to each identified candidate term, and aggregating a value from each applied scoring function to generate the score value. In some embodiments, the one or more scoring functions comprise a frequency scoring function, a context scoring function, a reference corpus comparison function, a topic modelling function, or any combination thereof.

In some embodiments, ranking the candidate terms according to the score values comprises sorting the candidate terms from a highest score value to a lowest score value. In some embodiments, when more than one scoring function is applied, the candidate terms are sorted according to a voting mechanism applied to each scoring function.

In some embodiments, filtering the ranked candidate terms comprises retaining a subset of the ranked candidate terms with score values at or above a predetermined threshold, and discarding the ranked candidate terms with score values below the predetermined threshold. In some embodiments, organizing the extracted terms into a taxonomy data structure comprises: identifying a plurality of pairs of terms in the extracted terms, wherein the terms in each pair of terms are different; labelling each pair of terms based upon whether one term in the pair of terms corresponds to a narrower concept than the other term in the pair of terms; and generating the taxonomy data structure using the labelled pairs of terms based upon the label applied to each pair of terms. In some embodiments, labelling each pair of terms based upon whether one term in the pair of terms corresponds to a narrower concept than the other term in the pair of terms comprises: generating a multidimensional feature vector corresponding to each pair of terms; training a classification model using a historical taxonomy data structure associated with the same subject matter domain as the received text; and executing the trained classification model using the multidimensional feature vectors as input to generate a label for each multidimensional feature vector, wherein the label corresponds to a probability estimation that one term in the pair of terms corresponds to a narrower concept than the other term in the pair of terms. In some embodiments, the features in the multidimensional feature vector comprise string-based features of the pair of terms, frequency-based features of the pair of terms, word embedding features of the pair of terms, and lexical features of the pair of terms. In some embodiments, the classification model is a Support Vector Machine (SVM) classifier.

In some embodiments, generating the taxonomy data structure using the plurality of pairs of terms based upon the label applied to each pair of terms comprises: building a candidate taxonomy data structure using each pair of terms based upon the label applied to the pair of terms; selecting a taxonomy likelihood score function for the candidate taxonomy data structure; and generating a taxonomy data structure using each pair of terms, that optimizes a score of the selected taxonomy likelihood score function. In some embodiments, the taxonomy likelihood score function comprises a transitive likelihood score function, a non-transitive likelihood score function, or a Bhattacharyya-Poisson likelihood score function. In some embodiments, generating the taxonomy data structure using each pair of terms comprises executing a greedy search using each pair of terms to optimize the score of the selected taxonomy likelihood score function. In some embodiments, generating the taxonomy data structure using each pair of terms comprises executing a beam search using each pair of terms to optimize the score of the selected taxonomy likelihood score function.

In some embodiments, generating one or more responses, using the taxonomy data structure, to messages received from the client computing device comprises: identifying one or more terms from a message received from the client computing device; traversing the taxonomy data structure to identify one of the one or more terms from the message and discover one or more logical connections between the identified term and one or more other terms; and generating a response to the message based upon the one or more logical connections between the identified term and the one or more other terms. In some embodiments, generating a response to the message based upon the one or more logical connections between the identified term and the one or more other terms comprises retrieving one or more resources to include in the generated response, wherein the retrieved one or more resources relate to at least one of the one or more other terms. In some embodiments, the retrieved resources include a URL, a digital document, a link to a digital document, or a text segment.

In some embodiments, the taxonomy data structure is a tree structure with the extracted terms as nodes of the tree structure and logical relationships between the extracted terms as edges of the tree structure.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a table of configurations for automatic term recognition experiments.

FIG. 6 is a table of evaluations for the automatic term recognition experiments.

FIG. 7 is a table of configurations of taxonomy construction experiments.

FIG. 8 is a table of precision of the taxonomy construction experiments.

DETAILED DESCRIPTION

Figure 1:
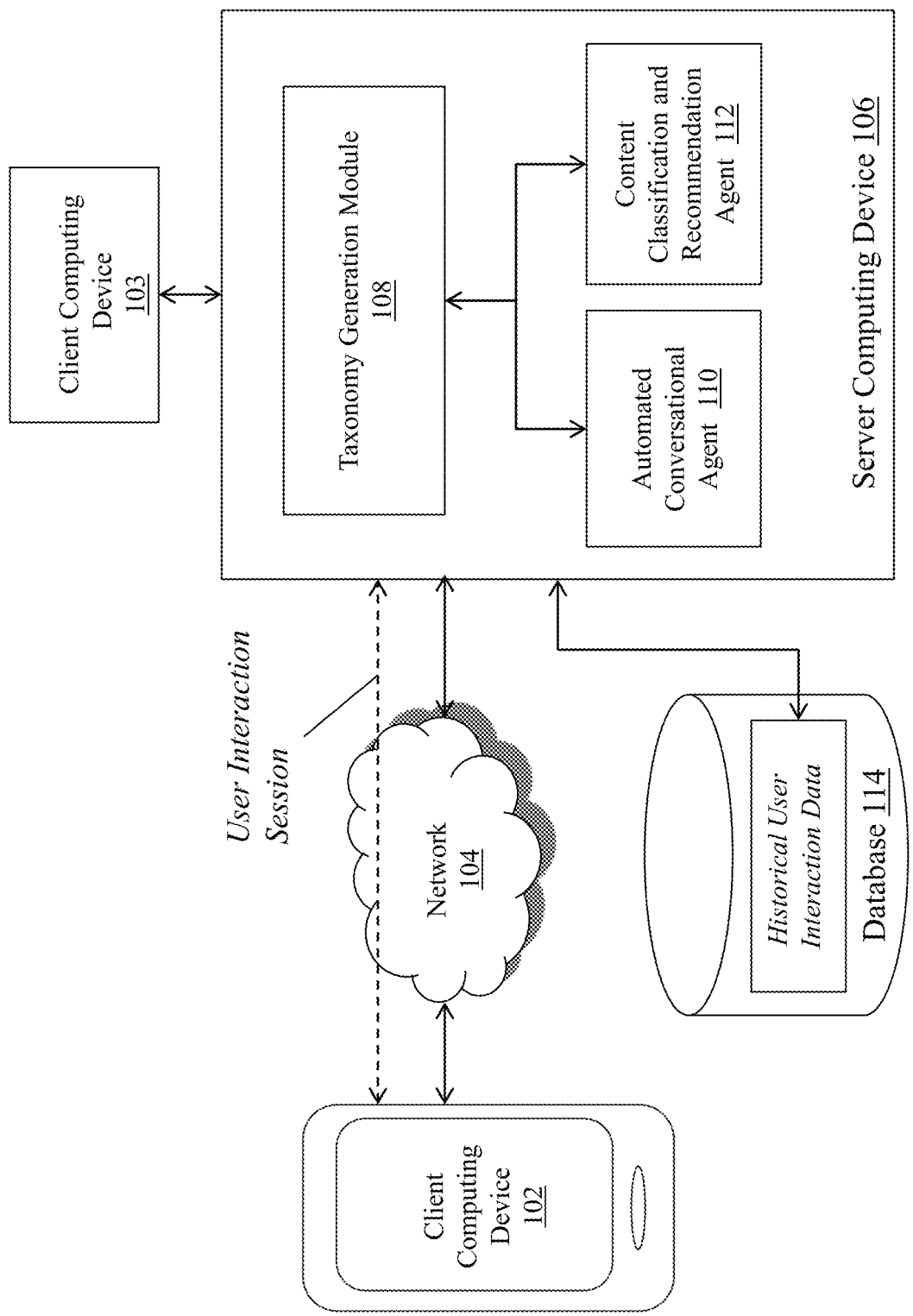
FIG. 1 is a block diagram of a system for building a knowledge base taxonomy from structured or unstructured computer text for use in automated user interactions.

FIG. 1 is a block diagram of a system 100 for building a knowledge base taxonomy from unstructured computer text for use in automated user interactions. The system 100 includes a client computing device 102, a client computing device 103, a communications network 104, a server computing device 106 that includes a taxonomy generation module 108, an automated conversational agent 110, and a content classification and recommendation agent 112, and a database 114 that includes historical user interaction data.

The client computing device 102 connects to the communications network 104 in order to communicate with the server computing device 106 to provide input and receive output relating to the process of building a knowledge base taxonomy from structured or unstructured computer text for use in automated user interactions as described herein. Exemplary client computing devices 102 include but are not limited to computing devices such as smartphones, tablets, laptops, desktops, smart watches, IP telephony devices, internet appliances, or other devices capable of establishing a user interaction communication session, such as a voice call or a text chat session, with client computing device 103 via server computing device 106. It should be appreciated that other types of devices that are capable of connecting to the components of the system 100 can be used without departing from the scope of invention.

The client computing device 103 is a computing device coupled to the server computing device 106 (e.g., either directly or via local communication network) and used to establish and participate in user interaction communication sessions that originate from the client computing device 102. In one example, the client computing device 103 is a workstation (e.g., desktop computer, laptop computer, telephony device) of a customer service agent in a call center that enables the agent to receive voice calls and/or text messages from client device 102, access information and perform actions using software on the client computing device 103 to provide responses and/or solutions to messages submitted by the client device 102. The client computing device 103 is capable of executing locally-stored software applications and also capable of accessing software applications delivered from the server computing device 106 (or other computing devices) via a cloud-based or software-as-a-service paradigm. The software applications can provide a wide spectrum of functionality (e.g., CRM, account, sales, inventory, ordering, information access, and the like) to the agent. In some embodiments, the client computing device 103 is a telephony device that is coupled to a computing device, where the telephony device receives a voice call that originated at the client computing device 102 and is routed through the server computing device 106 as described herein. As can be appreciated, other types of client computing devices 103 that can establish a voice communication session and/or text-based communication session with the server computing device 106 and/or the client computing device 102 are within the scope of invention.

In some embodiments, the client computing device 103 acts as a second level system for responding to or becoming involved in user interactions. For example, certain user queries or requests may be too complex for, e.g., the automated conversational agent 110 to handle. Therefore, the user interaction session can be routed to the client computing device 103 so that a customer service representative can understand the user's inquiry and respond appropriately.

The communications network 104 enables the client computing device 102 to communicate with the server computing device 106 and the client computing device 103. The network 104 is typically a wide area network, such as the Internet and/or a cellular network. In some embodiments, the network 104 is comprised of several discrete networks and/or sub-networks (e.g., cellular to Internet, PSTN to Internet, PSTN to cellular, etc.).

The server computing device 106 is a device including specialized hardware and/or software modules that execute on a processor and interact with memory modules of the server computing device 106, to receive data from other components of the system 100, transmit data to other components of the system 100, and perform functions for building a knowledge base taxonomy from structured or unstructured computer text for use in automated user interactions as described herein. The server computing device 106 includes a plurality of computing modules 108, 110, 112 that execute on one or more processors of the server computing device 106. In some embodiments, the modules 108, 110, 112 are specialized sets of computer software instructions programmed onto one or more dedicated processors in the server computing device 106 and can include specifically-designated memory locations and/or registers for executing the specialized computer software instructions.

Although the computing modules 108, 110, 112 are shown in FIG. 1 as executing within the same server computing device 106, in some embodiments the modules 108, 110, 112 can be distributed among a plurality of server computing devices. As shown in FIG. 1, the server computing device 106 enables the modules 108, 110, 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the computing modules 108, 110, 112 is described in detail throughout this specification.

In some embodiments, the taxonomy generation module 108 can comprise a software program that receives historical user interaction data (e.g., in the form of structured or unstructured text) from database 114 and processes the user interaction data as described herein to generate one or more taxonomy data structures that represent domain-specific knowledge for use by modules 110 and 112 for performing certain automated customer service tasks (e.g., a digital agent responding to customer inquiries via chat) or for performing content classification routines.

In some embodiments, the automated conversational agent 110 can comprise a software program (e.g., a chat bot or other digital conversational agent, an interactive voice response (IVR) platform) that receives user interactions from client device 102 and responds to the user interactions. In these embodiments, an actual customer service agent is not required to control or monitor the client device 103; instead, the software program is configured to participate in a communication session with a user at client device 102 automatically. For example, a user at client computing device 102 can establish a communication session with client computing device 103 via server computing device 106 by, e.g., opening a chat window in browser software that connects to the server computing device 106—which interfaces with client computing device 103 to automatically respond to text messages provided from client device 102. In one example, the automated conversational agent 110 can identify terms contained in a user's message (e.g., a request for information), and traverse the taxonomy data structure described herein to identify one or more other terms that are related to the identified terms, then retrieve content and/or generate messages in response to the user's message. For example, if a user submits a message asking about retirement funds, the automated conversational agent 110 can identify the term "retirement fund" in the message, traverse the taxonomy data structure to determine that the terms "401k," 403b", "Roth IRA," etc. are related to the term "retirement fund," and retrieve digital content (e.g., documents, brochures, web links, text) that describes and/or relates to the other related terms. The automated conversational agent 110 can then provide the retrieved digital content to the client computing device 103 (e.g., as part of a chat session) in response to the user's message. Other types of automated response systems (e.g., procedurally-generated computer speech) can be utilized within the scope of invention described herein.

In some embodiments, the content classification and recommendation agent 112 can comprise a software program that receives unclassified content (e.g., documents, articles, recommendations) from database 114 or an external source, and uses the taxonomy data structure(s) generated by the taxonomy generation module 108 as described herein to classify the content into one or more subject matter/relevancy groupings based upon, e.g., structured or unstructured text contained within the content. For example, the content classification and recommendation agent 112 can determine that certain unclassified content belongs to one or more specific subject matter groupings (e.g., 401k, tax, retirement planning, etc.) based upon the text contained within the content, when a taxonomy data structure is applied. The use of the taxonomy generated by the module 108 provides for a more efficient and accurate classification of the content, so that the content can be directed to, e.g., mobile applications, web applications, etc. where one or more users can view it (and where those users are more likely to interact with or respond to the content).

The database 114 is a computing device (or in some embodiments, a set of computing devices) coupled to the server computing device 106 and is configured to receive, generate, and store specific segments of data relating to the process of building a knowledge base taxonomy from structured or unstructured computer text for use in automated user interactions as described herein. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below. An exemplary database 116 is MySQL™ available from Oracle Corp. of Redwood City, Calif.

The database 114 includes historical user interaction data which, in some embodiments, is a dedicated section of the database 114 that contains specialized data (such as structured or unstructured computer text) used by the other components of the system 110 to perform the process of building a knowledge base taxonomy from structured or unstructured computer text for use in automated user interactions as described herein. Further detail on the structure and function of the historical user interaction data is provided below.

Figure 2:
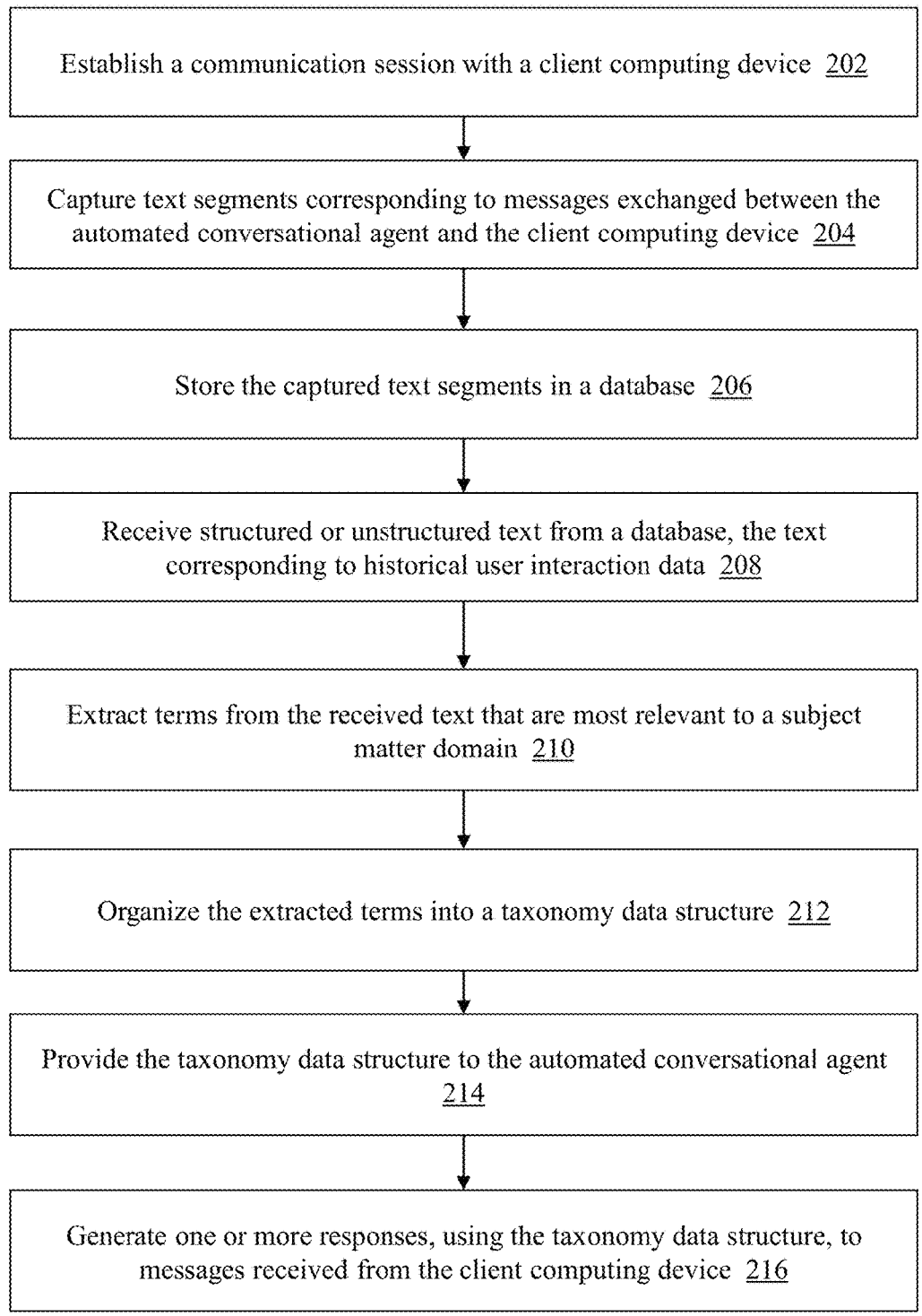
FIG. 2 is a flow diagram of a computerized method of building a knowledge base taxonomy from structured or unstructured computer text for use in automated user interactions.

FIG. 2 is a flow diagram of a computerized method 200 of building a knowledge base taxonomy from structured or unstructured computer text for use in automated user interactions, using the system 100 of FIG. 1. The client computing device 102 initiates a communication session (e.g., text chat session) via communications network 104 to, e.g., server computing device 106. For example, a user at client computing device 102 can launch a chat application/browser window on the device 102, which establishes (202) a connection to server computing device 106. The server computing device 106 can route the communication session to the automated conversational agent 110 (e.g., an automated IVR or chat bot module) to participate in the communication session with the client computing device 102.

In the case of a chat session, as the user of client computing device 102 and the automated conversational agent 110 begin exchanging messages with each other, the server computing device 106 can capture (204) one or more text segments corresponding to messages of the agent and/or the user—as the user of device 102 is providing information and/or as the chat bot is responding to the information from the user. The server computing device 106 stores (206) the captured text in database 114. It should be appreciated that, in some embodiments, the server computing device 106 continuously captures text segments from the agent and/or the user throughout the chat session and uses the text segments in the manner described herein. For example, the server computing device 106 can be configured to continuously capture and measure text segments according to defined settings (e.g., single message segments, multiple message segments). In some embodiments, the server computing device 106 can record one or more timestamps associated with the text messages to determine how quickly or how slowly the messages are provided in the chat session.

The server computing device 106 receives structured and/or unstructured computer text associated with communications made by the agent 110 and stores the text in, e.g., database 114. It should be appreciated that the server computing device 106 can store such computer text from many different user interaction sessions, over a period of time, in order to develop the historical user interaction data in database 114. Then, the taxonomy generation module 108 can receive (208) the structured and/or unstructured computer text stored in database 114 to generate the taxonomy data structures and data relationships described herein.

As described above, conversational agents need to have domain-specific knowledge in order to be effective interfaces for human-computer interaction. The technical approach described herein to build the taxonomy knowledge base comprises two steps. First, the taxonomy generation module 108 extracts (210) the terms that are most relevant to the domain, a task referred to as automatic term recognition (ATR). Current approaches to this task have employed a varied suite of flexible methods for extracting terms from text based on parts of speech and metrics for assessing 'termhood' (such as described in Spasić, I., Greenwood, M., Preece, A., Francis, N., Elwyn, G.: *Flexiterm: a flexible term recognition method*, Journal of biomedical semantics 4(1), 27 (2013); and as described in Cram, D., Daille, B.: *Terminology extraction with term variant detection*, Proceedings of ACL-2016 System Demonstrations pp. 13-18 (2016)), domain modelling (such as described in Buitelaar, P., Bordea, G., Polajnar, T.: *Domain-independent term extraction through domain modelling*, In: The 10th international conference on terminology and artificial intelligence (TIA 2013), Paris, France. 10th International Conference on Terminology and Artificial Intelligence (2013)), and the composition of multiple metrics in an unsupervised manner (such as described in Astrakhantsev, N.: *Automatic term acquisition from domain-specific text collection by using Wikipedia*, Proceedings of the institute for system programming 26(4), 7-20 (2014)). More recently, these methods have been combined into off-the-shelf tools such as ATR4S (as described in Athreya, supra) and JATE (as described in Zhang, Z., Gao, J., Ciravegna, F.: *Jate 2.0: Java automatic term extraction with apache solr*, In: Proceedings of the Tenth International Conference on Language Resources and Evaluation (LREC-2016) (2016)).

The second step is for the taxonomy generation module 108 to organize (212) these terms into a taxonomy data structure. An exemplary taxonomy data structure includes, but is not limited to, a knowledge graph. Although similar to hypernym learning (as described in Snow, R., Jurafsky, D., Ng, A. Y.: *Learning syntactic patterns for automatic hypernym discovery*, In: Advances in neural information processing systems. pp. 1297-1304 (2005)), the challenges it proposes are quite different (see Bordea, G., Lefever, E., Buitelaar, P.: *SemEval-2016 task 13: Taxonomy extraction evaluation (TexEval-2)*, In: Proceedings of the 10th International Workshop on Semantic Evaluation (SemEval-2016). pp. 1081-1091 (2016)). Multiple string and grammar-based methods have been proposed, where baseline systems have used string-based metrics with Hearst-like patterns learned from text (as described in Panchenko, A., Faralli, S., Ruppert, E., Remus, S., Naets, H., Fairon, C., Ponzetto, S. P., Biemann, C.: *TAXI at SemEval-2016 Task 13: a taxonomy induction method based on lexico-syntactic patterns, substrings and focused crawling*, In: 10th International Workshop on Semantic Evaluation (SemEval-2016) (2016)), while more advanced methods have been based on the concept of endocentricity of terms to indicate a hypernym-like relationship (as described in Tan, L., Bond, F., van Genabith, J.: *USAAR at SemEval-2016 Task 13: Hyponym endocentricity*, In: 10th International Workshop on Semantic Evaluation (SemEval-2016) (2016)). Other methods not based on grammar such as genetic algorithms (see Cleuziou, G., Moreno, J. G.: *QASSIT at SemEval-2016 Task 13: On the integration of semantic vectors in pretopological spaces for lexical taxonomy acquisition*, In: 10th International Workshop on Semantic Evaluation (SemEval-2016). pp. 1315-1319 (2016)) or word embeddings (as described in Fu, R., Guo, J., Qin, B., Che, W., Wang, H., Liu, T.: *Learning semantic hierarchies via word embeddings*, In: Proceedings of the 2014 Conference of the Association for Computational Linguistics. pp. 1199-1209 (2014) and Sarkar, R., McCrae, J. P., Buitelaar, P.: *A supervised approach to taxonomy extraction using word embeddings*, In: Proceedings of the Eleventh International Conference on Language Resources and Evaluation (LREC-2018) (2018)) have also been explored.

Then, the taxonomy generation module 108 can provide (214) the taxonomy data structure to the automated conversational agent 110 (and/or store the taxonomy data structure in database 114). The automated conversational agent 110 generates (216) one or more responses, using the taxonomy data structure, to messages received from the client computing device 103.

With expectations for the capabilities of virtual assistants or automated chat bots increasing, there is a need to empower these types of chat bots with overall domain knowledge, contextual awareness within a conversation or chat session and a personalized answer, as a predefined answer template for a given question may not be adequate. For example, a typical question and answer (Q&A)-based chat bot provides the same answer to every user for a question like: "May I contribute to my retirement account?" However, in reality, the presence of the word "my" demands that the chat bot needs to response differently based on user profile. The answer may be different for an already-retired user versus a non-retired user. To address this issue, the systems and methods described herein (known as Conversational Concept AI (CCAI)) enable a virtual assistant or automated chat bot to include a Natural Language Understanding (NLU) component, that can perform:

Intent identification as well as entity detection for the Dialog Manager;

Customer intent disambiguation by leveraging other metadata; and

Dialog pattern monitoring in real time to help provide personalized answers.

These goals of the CCAI systems and methods described herein are realized by topic extraction and taxonomy generation from unstructured conversational text. Thus, the systems and methods have created a self-service text analytic tool trained on specific subject matter domain data that understands specific concepts (for example, in the financial services domain, concepts like mutual fund or dividend reinvestment) as a "thing" and not a list of words, like most commercial products do. Therefore, the CCAI methods and systems are able to provide a summary of the topics present in documents. It should be appreciated that once the taxonomy data structure is generated, the systems and methods (and/or other computing devices or tools) can use the taxonomy as a key part of the information processing in their workflows.

In addition, the CCAI methods and systems described herein can parse a corpus of conversational unstructured and/or structured text, and extract entities and the relationship between entities, which enables users to track various business needs such as: product mentions, content gap, trending topics in customer interactions and help optimizing customer service process.

Some exemplary applications and use cases of the methods and systems described herein are set forth below. As can be appreciated, the methods and systems described herein are designed to support a number of use cases to, e.g., derive business insights and trends. There are many applications and use cases that directly use the taxonomy construction work described herein:

For example, the taxonomy data structure can be leveraged to construct a taxonomy builder tool that:

Expands small hand-crafted taxonomies using a semi-supervised approach;

Merges multiple taxonomies;

Automatically adds/deletes entities to a central taxonomy based on new content/products.

With the increased use of interactive digital assistants and advances in NLU technologies, users now expect chat bots to understand complex, multi-intent utterances. A single user utterance may contain context or a description of the issue followed by a request for help or information. A hypothetical example may be expressed as: "User: Hi, I am thinking to transfer some money to that account but I am not sure if I am allowed to."

Real time taxonomy mapping and State tracking: Taxonomy extraction consists of extracting a set of terms from a corpus and organizing them into a taxonomic structure (see, e.g., Bordea, G., supra), i.e. a hierarchical tree structure where terms closer to the root of the tree are considered broader than terms farther to the root. In this example, by 'broader,' we do not mean hypernymy, but that the topic has a wider scope.

Additionally, in a natural conversation, user often refer to previous utterances through pronouns. For example, a variation to the previous hypothetical example may look like:

User 1 (Customer): "Hi, I am thinking to transfer some money to that account but I am not sure if I am allowed to."

. . .

User 2 (Agent): That's great, can you please provide instructions for wire transfer?

. . .

User 2 (Agent): What is the routing number?

The above example may appear simple to human-human conversation however for a chat-bot the conversation is challenging due cross reference ("that account"), inferred entities ("allowed to," "routing number") and state transition of inter-linked entities (feasibility of wire transfer to a retirement account).

A key objective of the systems and methods described herein is to map the entities in the utterances in real time and track the transition of intents through traversal of knowledge graph/ontology and provide the most relevant information to the user.

The framework described herein for taxonomy extraction from text is divided into two steps: automatic term recognition and taxonomy construction. The term recognition step aims at detecting the most relevant terms (also referred to as keyphrases) for a domain represented by a corpus. Based on this list of terms, the taxonomy construction step aims at finding a suitable taxonomy that maintains the correct broad/narrow relationship between terms.

Definition 1.

Figure 3:
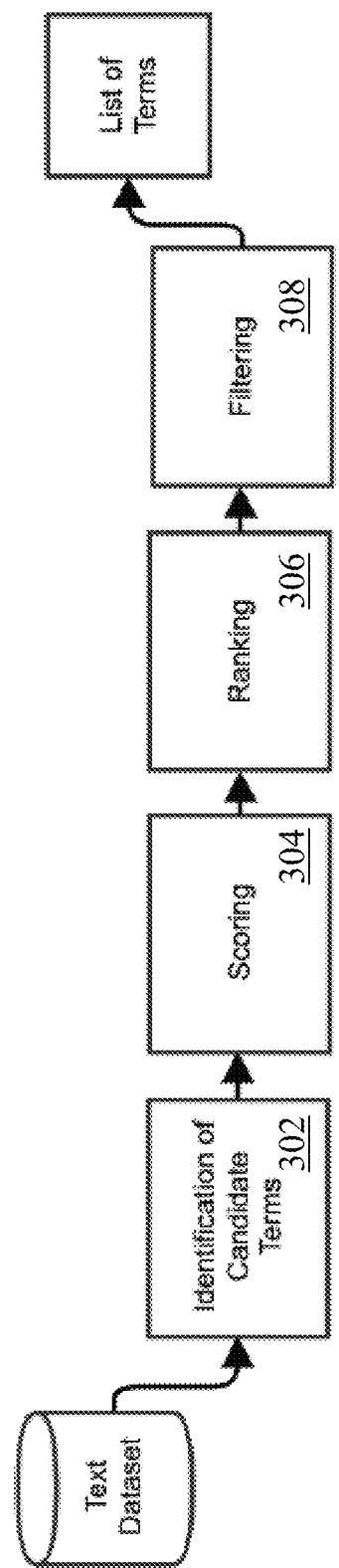
FIG. 3 is a flow diagram of a method of automatic term recognition for building a knowledge base taxonomy from structured or unstructured computer text.

Given a set of terms T in which each $t \in T$ is represented by a label $t_1$. A taxonomy, $\mathcal{T} = (T, \sqsubseteq)$, is then defined as a partial ordering of a set of terms, T, satisfying the following constraints:

(Reflexivity) $t \sqsubseteq t \forall t \in T$ (Antisymmetry) $t_1 \sqsubseteq t_2$ and $t_2 \sqsubseteq t_1$ if and only if $t_1 = t_2 \forall t_1, t_2 \in T$ (Transitivity) $t_1 \sqsubseteq t_2$ and $t_2 \sqsubseteq t_3$ implies $t_1 \sqsubseteq t_3 \forall t_1, t_2, t_3 \in T$ (Unique parent) if $t_1 \sqsubseteq t_2$ and $t_1 \sqsubseteq t_3$ then $t_2 \sqsubseteq t_3$ or $t_3 \sqsubseteq t_2 \forall t_1, t_2, t_3 \in T$ (Single root) There is some element $r \in T$ such that $t \sqsubseteq r \forall t \in T$ Automatic Term Recognition For term recognition, the taxonomy generation module 108 uses a corpus-based approach based on a pipeline of four consecutive steps, as shown in FIG. 3: (i) identification of candidate terms (302), (ii) scoring (304), (iii) ranking (306), and (iv) filtering (308).

The identification of candidate terms step (302) comprises identifying the key terms appearing within each document. This is accomplished by the taxonomy generation module 108 detecting all noun phrases appearing in the corpus that:

Contain a minimum and a maximum number of n-grams.

Do not either start or end with a stopword (as described in Hulth, A.: *Enhancing linguistically oriented automatic keyword extraction*, In: Proceedings of HLT-NAACL 2004: Short Papers (2004)).

Follows a set of part-of-speech patterns empirically found to be associated with terms (as described in Hulth, supra, and in Bordea, G.: *Domain adaptive extraction of topical hierarchies for Expertise Mining*, Ph.D. thesis (2013)).

Occurs within the corpus at least a given number of times.

The scoring step (304) provides a quantitative measurement for the relevance of each candidate term to the domain in the corpus. As the notion of relevance changes from one application area to another, the scoring step can make use of one or multiple scoring functions more suitable for the underlying domain and task. For example, the taxonomy generation module 108 can use multiple combinations of scoring functions for the choice of terms in, e.g., the financial customer service domain.

Formally, consider C a corpus and $t \in C$ a candidate term extracted in the step for identification of candidate terms (302). The score for a given term t is a n-tuple $score(t) = (f_1(t), f_2(t), \ldots, f_n(t))$ given by a set of functions that indicate the relevance of t in C for a task T.

Scoring functions can be evaluated within four categories:

Frequency of occurrences: scoring functions that consider only frequencies of candidate terms within the corpus and/or frequency of words occurring within candidate terms (TF-IDF, Residual IDF (as described in Church, K. W., Gale, W. A.: *Poisson mixtures*, Natural Language Engineering 1(2), 163-190 (1995)), C Value (as described in Ananiadou, S.: *A methodology for automatic term recognition*, In: COLING 1994 Volume 2: The 15th International Conference on Computational Linguistics. vol. 2 (1994)), ComboBasic (as described in Astrakhantsev, N.: *Methods and software for terminology extraction from domain-specific text collection*, Ph.D. thesis, Institute for System Programming of Russian Academy of Sciences (2015)).

Context of occurrences: scoring functions that follow the distributional hypothesis (as described in Harris, Z. S.: Distributional structure, Word 10(2-3), 146-162 (1954)) to distinguish terms from non-terms by considering the distribution of words in their contexts (PostRankDC (as described in Buitelaar, P., Bordea, G., Polajnar, T.: *Domain-independent term extraction through domain modelling*, In: The 10th international conference on terminology and artificial intelligence (TIA 2013), Paris, France. 10th International Conference on Terminology and Artificial Intelligence (2013))).

Reference corpora: scoring functions based on the assumption that terms can be distinguished from other words and collocations by comparing occurrence statistics in the dataset against statistics from a reference corpus—usually of general language/non-specific domain (Weirdness (as described in Ahmad, K., Gillam, L., Tostevin, L., et al.: *University of Surrey participation in TREC8: Weirdness indexing for logical document extrapolation and retrieval (wilder)*. In:

TREC. pp. 1-8 (1999)), Relevance (as described in (Peñas, A., Verdejo, F., Gonzalo, J.: *Corpus-based terminology extraction applied to information access*, In: Proceedings of Corpus Linguistics. vol. 2001, p. 458. Citeseer (2001))).

Topic modelling: scoring functions based on the idea that topic modelling uncovers semantic information useful for term recognition, in particular that the distribution of words over the topics found by the topic modelling is a less noisy signal than the simple frequency of occurrences (Novel Topic Model (NTM) (as described in Li, S., Li, J., Song, T., Li, W., Chang, B.: *A novel topic model for automatic term extraction*, In: Proceedings of the 36th international ACM SIGIR conference on Research and development in information retrieval. pp. 885-888. ACM (2013))).

The ranking step (306) sorts all candidate terms from the most relevant (i.e. highest score value) to the least relevant (i.e. lowest score value). However, depending on the amount of scoring functions used, the ranking mechanism will be different:

Single score: where only one score function is used, all terms are sorted in ascending order of their associated score value.

Voting: when more than one scoring function is used, the ranking is based on the voting mechanism from, e.g., Zhang, Z., Iria, J., Brewster, C., Ciravegna, F.: *A comparative evaluation of term recognition algorithms*, In: Proceedings of the Sixth International Conference on Language Resources and Evaluation (LREC-2008). vol. 5 (2008) and happens in two steps. In the first step, the single score procedure is applied to each scoring function used, resulting in a set of ranked lists R—one list per scoring function. Next, the final ranking position for a candidate term t is given by Equation 1 below where n is the number of scoring functions used and $R_i(t)$ is the rank position of t as provided by the scoring function i.

$$\text{rank}(t) = \sum_i^n \frac{1}{R_i(t)} \qquad \text{EQUATION 1}$$

Last, the filtering step (308) keeps only the top n terms after the ranking step (where n is a parameter provided to the algorithm).

Taxonomy Construction

Figure 4:
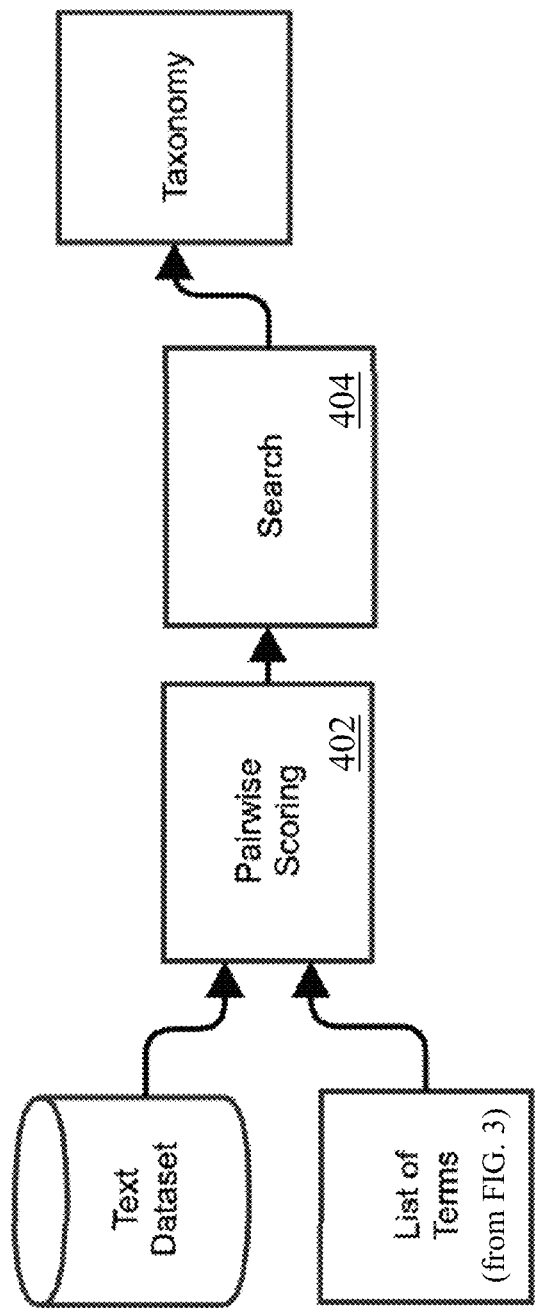
FIG. 4 is a flow diagram of a method of taxonomy construction.

Taxonomy construction aims to build a taxonomy based on the terms extracted by the automatic term recognition algorithm. The pipeline comprises two consecutive steps (as shown in FIG. 4): (i) pairwise scoring (402), and (ii) search (404). In the first step (402), each pair of terms extracted $\{\forall (c,d) \in T | c \neq d\}$ receives a score referring to the estimated probability $p(c \sqsubseteq d)$ that c is a narrower term than d. This score is based on the terms themselves and on their corpus frequency. Based on this set of scores, the second step (404) searches for a tree structure that maximizes the likelihood of it being a taxonomy, according to a pre-defined taxonomy likelihood score. The result of this process is a taxonomy $\mathcal{T}$ containing all the terms provided as input.

Pairwise Scoring

Pairwise scoring (402) aims at identifying, for a pair of terms (c, d) where (c≠d), if c is a narrower concept than d(c $\sqsubseteq$ d). The taxonomy generation module 108 accomplishes this by using a supervised learning setting.

For each pair of terms (c, d) a feature vector is created with features from the following four categories:

String-based features: Features in this category presume that shorter terms embedded within longer ones are more general. For instance, 'funds' is more general than 'mutual funds.' Features in this category are: Inclusion, overlap, and longest common substring (LCS). Inclusion is +1 if c is totally contained within d, −1 if d is totally contained within c, or 0 otherwise. Overlap represents how many words are shared between two terms. Last, LCS measures the longest string of characters shared by two terms.

Frequency-based features: This category assumes that the generality or specificity of a term influences its frequency in the domain corpus. Features in this category are: relative frequency and term difference. Relative frequency measures the difference between the frequency of two terms (Equation 2 below, where f(x) denotes the frequency of term x). Term difference measures the difference in the distribution of two terms (Equation 3 below, where D(x) denotes the number of documents in which the term x appears).

$$\text{relativeFrequency}(c, d) = \log\left(\frac{f(d)}{f(c)}\right) \qquad \text{EQUATION 2}$$

$$\text{termDifference} = \frac{|D(c) \cap D(d)|}{|D(d)|} \qquad \text{EQUATION 3}$$

Word embedding features: Features in this category intend to capture the generality of a term by the relation it has with other terms in a shared latent semantic space. For that, GloVe vectors (described in Pennington, J., Socher, R., Manning, C.: *GloVe: Global vectors for word representation*, In: Proceedings of the 2014 conference on empirical methods in natural language processing (EMNLP). pp. 1532-1543 (2014)) are gathered by the taxonomy generation module 108 for each word within a term c in order to generate a vector $v_c$ for the whole term using Single Value Decomposition (SVD) (as described in Sarkar, R., McCrae, J. P., Buitelaar, P.: *A supervised approach to taxonomy extraction using word embeddings*, In: Proceedings of the Eleventh International Conference on Language Resources and Evaluation (LREC-2018) (2018)). Two approaches are used, each one leading to a different word embedding feature: SVD average and SVD minmax. The word embedding (WE) features used for pairwise scoring between a pair (c, d) are calculated according to Equation 4 below.

$$\text{WE}(c,d) = v_c^T A v_d \qquad \text{EQUATION 4}$$

Lexical features: Features in this category take advantage of existing lexical databases (e.g. Wordnet (as described in Miller, G.: *WordNet: An electronic lexical database*, MIT press (1998)) with information on the generality of terms (i.e. $c \sqsubseteq d$). Features available are: complete hypernyms (CH) and word hypernyms (WH). The CH feature measures if both terms appear related (directly or indirectly) within the background database, whereas the WH feature measures the presence of relations between any two pairs of words in terms c and d according to Equation 5 below.

$$WH(c, d) = \frac{\#words(t_c) + \#words(t_d)}{2} \sum CH(w_c, w_d) \quad \text{EQUATION 5}$$

A SVM (Support Vector Machine) classifier is then trained using a manually-created taxonomy with an associated corpus in the same domain. Each pair of terms (c, d) where c≠d and c is a child of d in the training taxonomy is labelled with +1, otherwise the pair is labelled as −1. The result of the classification is the probability estimation for the class +1 which is then given as the estimate for $p(c \sqsubseteq d)$.

Search

Based on the pairwise score between any two terms provided as input to the taxonomy construction, the search step aims at identifying a tree structure that represents a taxonomy of these terms. In order to identify how close a tree structure is to a valid taxonomy, a taxonomy likelihood score was designed. Three score functions have been designed and evaluated: transitive, non-transitive, and Bhattacharyya-Poisson. The goal for the search is to find a tree-structure that maximizes the taxonomy likelihood score. Here, two types of search methods were experimented with: greedy and beam.

Taxonomy Likelihood Score

Transitive.

The transitive score (Equation 6 below) just follows the basic assumption that the best taxonomy is the one that maximizes the product of all $p(c \sqsubseteq d)$ for all (c, d) pairs of terms. In practice, the system takes logs of the probabilities and maximizes the resulting sum (Equation 7 below).

$$S(T) = \prod_{c \sqsubseteq d} p(c \sqsubseteq d) \quad \text{EQUATION 6}$$

$$\max_T S(T) = \max_T \sum_{c \sqsubseteq d} \log p(c \sqsubseteq d) \quad \text{EQUATION 7}$$

Non-Transitive.

In practice, the transitive score is not expected to work well since it is maximized by taxonomies for which there are as few as possible pair of terms (c, d) such that $c \sqsubseteq d$. The most trivial case is when a taxonomy is composed only by a single root term and all other terms are a direct child of it. As such, taxonomies that are constructed from maximizing the transitive score tend to have a very large number of average children. In order to avoid that, the non-transitive score (Equation 8 below) considers only the set of direct children, which are denoted by c≤d and should satisfy the following constraints:

c≤d implies $c \sqsubseteq d$.

$c \sqsubseteq d$ implies there exists e such that c≤e and $e \sqsubseteq d$.

For all, c≤d there does not exist e, e≠d, e≠c, such that c≤e and e≤d.

$$S_{nonTransitive}(T) = \prod_{c \leq d} p(c \sqsubseteq d) \quad \text{EQUATION 8}$$

Bhattacharyya-Poisson.

Despite the possible improvement given by the non-transitive likelihood function, it may still lead to a single path (i.e. a tree with just one branch), what differs from usual expectations for taxonomies as more balanced trees (i.e. tree structures with multiple branches). In order to address this, the Bhattacharyya-Poisson likelihood score takes into account the number of children of each node in the tree.

Formally, let $n_c$ denote the number of terms in a taxonomy that have exactly c children. If the tree was to be constructed in a truly random fashion we would expect $n_c$ to be distributed according to a binomial distribution (Equation 9 below). However, in a completely balanced tree of N terms there are N−1 direct children so that the number of children in each branch is $$p = \frac{(N-1)}{b},$$

where b is the number of branches. In order to allow us to vary the average number of children in each branch (λ), since taxonomies do not need to be completely balanced, we use the Poisson distribution as an approximation for the binomial distribution (Equation 10 below). However, the constraints on what constitutes a taxonomy fix this value to very near 1 and we wish to vary this in order to control the taxonomy structure. We thus ignore the leaf nodes in the taxonomy (i.e., we ignore $n_0$).

$$p(n_c = m) = \text{choose}(N, m) p^m (1-p)^{N-m} \quad \text{EQUATION 9}$$

$$p(n_c = m) \simeq \frac{\lambda^m e^{-\lambda}}{m!} \quad \text{EQUATION 10}$$

In order to measure the similarity of the candidate taxonomy with this theoretical probability value we use the Bhattacharyya distance (as described in Bhattacharyya, A.: *On a measure of divergence between two statistical populations defined by their probability distributions*, Bull. Calcutta Math. Soc. 35, 99-109 (1943)) that measures the similarity of two (discrete) probability distributions p and q as provided in Equation 11 below. If we compare this to the actual children count in a taxonomy, we can score a taxonomy as provided in Equation 12 below. Finally, this is interpolated with the previous metric to score a taxonomy as provided in Equation 13 below.

$$B(p, q) = \sum_i \sqrt{p_i q_i} \quad \text{EQUATION 11}$$

$$BP(T) = \sum_{i=1}^{N} \frac{n_i \lambda^{n_i} e^{-\lambda}}{(N - n_0) n_i!} \quad \text{EQUATION 12}$$

$$S_{BP}(T) = \prod_{c \leq d} p(c \sqsubseteq d) + \alpha N \times BP(T) \quad \text{EQUATION 13}$$

Search Method

Having chosen the likelihood score, the next step is to use a search strategy that optimizes this likelihood score. As mentioned above, two search strategies were used: (i) greedy, and (ii) beam.

Greedy—In this method, provided the pairwise scores for all pairs of terms, the pair that has the maximal score for p(c d) is added as c≤d. This process is repeated until a full taxonomy is constructed, that is we take pairs c≤d that satisfy the first four axioms of the taxonomy, from the first (reflexivity—unique parent) until the final axiom is satisfied (single root), which means the taxonomy is complete.

Beam—In contrast to the greedy method, where only a single partially constructed taxonomy is maintained, this method keeps a list of the top scoring possible solutions. This list (also called beam) is of a fixed size, thus the addition of a new partial solution may cause the least scoring partial solution to be dropped. Complete solutions are stored in a separate beam and the algorithm proceeds until it has considered all possible pairs of concepts and returns the highest scoring complete solution found.

Experiments

Experiments in automatic term recognition were performed based on an anonymized customer service chatlog dataset. In order to use such dataset, first we need to decide what is the unit of analysis or, in other words, what would be considered a document in the corpus. There are two obvious options: each interaction made by a customer or an agent, or the whole customer-agent conversation. In the experiments, the whole conversation is used as unit of analysis for two reasons: (i) to give priority to terms frequent in conversations rather than those cited multiple times only in a single conversation; and (ii) because different elements in a conversation could provide contextual information for the terms extracted.

Also, in order to protect customers' identities and personal data, the corpus provided is full of anonymization tokens, i.e. tokens that were put in place of what would be sensitive information (e.g. name, email address, etc.). Before conducting any experiment, a list of stopword terms was compiled containing all anonymization tokens appearing in the corpus so that these would not be captured as terms due to their potential high frequency in the corpus.

After preprocessing the corpus, several experiments were conducted in order to identify the most suitable configuration for automatic term recognition in the customer-agent interaction scenario. First, we adjusted the hyper-parameters for identification of candidate terms: the part-of-speech patterns used are given by the literature (as described in Bordea, G., supra, and Hulth, A., supra), the list of stopwords includes common English stopwords and the anonymization tokes extracted, a relevant term should have frequency higher than 2, and it should not have an unlimited size so we choose a maximum of 4-grams and we varied the minimum n-gram between 1 and 2. Table 1 (shown in FIG. 5) summarizes the configuration of each experiment.

For scoring functions we chose TF-IDF as a baseline due to its common use in measuring relevant terms in a corpus. We also opted to have settings with one function from each category to measure how they behave independently, except the reference corpora category since using Wikipedia as background corpus could give a high number of false positive terms if used alone. Also, we included a configuration (TE1 and TE2) that has demonstrated positive results in previous experiments. And last, due to the positive results of the use of ComboBasic (TE2 long) we experimented combining it with a reference corpora scoring function.

Results and Discussion:

The evaluation of the automatic term recognition experiments was based on the manual evaluation of a list of terms. A group of domain experts (i.e. seven associates at our partner organization developing taxonomy-based applications) were asked to evaluate the relevance of each term to the financial domain according to a 5-point Likert-type scale (from irrelevant to very relevant). Any term rated as either 4 or 5 by a majority of annotators (i.e. at least four annotators) was considered a relevant term in the financial domain.

The list of terms for evaluation was generated by merging the top 100 terms extracted by each experiment, removing duplicates and ranking them using the Mean Reciprocal Rank (as described in Craswell, N.: *Mean reciprocal rank*, Encyclopedia of Database Systems pp. 1703-1703 (2009). The final list was then limited to a manageable number of terms (200 terms) sent for manual validation by a team of experts in the financial customer service domain. Since each term may appear in more than one experiment, Table 2 in FIG. 6 reports how much of the evaluation list is covered by each experiment. The result of each experiment is then evaluated using precision, i.e. the proportion of correct terms among those appearing in the evaluation set. Based on this evaluation, the experiments TE2 log and TE3 were the ones to provide the best results in our experiments.

The positive results using the ComboBasic feature are mostly due to its ability to remove conversational words (such as \good morning", \thanks"). Because greetings do not appear in the corpus either as part of longer combination of words (e.g. \good morning" will not typically be a substring of any longer noun phrase), or as an aggregation of smaller and frequent terms (e.g. \morning" is not a frequent term in the corpus and \good" is not even considered a term for being an adjective), then the requirements for frequency and term embeddedness expected by ComboBasic will be less likely to consider greetings as terms.

On the other hand, experiments based on ComboBasic failed to retrieve terms of different lengths. In fact, only the experiment TE5 retrieved a mix of single and multi-word terms. Also, other irrelevant terms that could have been removed by filtering out common out-of-domain terms using the weirdness feature (TE3 long) did not have the expected result. The interpretation we give is that Wikipedia is not the most suitable corpus for this use case. In the future, we would like to experiment with customer service data in other domains so that we could remove terms that are common to customer service domain in general while keeping those that are specific to customer service in the financial domain. The difficulty lies in the availability of such datasets.

Taxonomy Construction

The objective of the taxonomy construction experiments are twofold: (i) to evaluate the combination of likelihood score and search methods that generate the best taxonomy structure; and (ii) to verify the impact of using an in-domain taxonomy as training data for the pairwise scoring function.

In order to separate the error generated by the automatic term recognition from the results of the taxonomy construction, we did not use the terms extracted previously. Instead, three manually constructed financial taxonomies (i.e., financial products, financial sectors, and financial topics) were used to inform the terms to be used in each experiment. The products taxonomy was used to train the in-domain model for pairwise scoring while the remaining taxonomies were used as gold standard for evaluation.

First, two pairwise scoring models were trained using LibSVM (described in Chang, C. C., Lin, C. J.: *LIBSVM: a library for support vector machines*, ACM transactions on intelligent systems and technology (TIST) 2(3), 27 (2011)), a library for support vector classification. The first model is trained on an out-of-domain taxonomy (food domain) and background corpus provided by the TexEval challenge (see Bordea, G., supra). The second model is trained using the products taxonomy and the pages in the partner's website as a corpus for extraction of features required by the Pairwise Scoring algorithm. All relationships between terms (c, d) appearing in the training taxonomy are given as positive examples (+1) and any other combination of terms is a negative example (−1). As the negative class sample is very large we perform negative sampling, with a fixed ratio of 5 negative examples to each positive one. The pairwise scoring uses the probability estimation in LibSVM by returning the probability that the class is +1 as p(c⊑d).

The workflow for comparison of taxonomy construction configurations using the different models is the following:

Step 1. The term extraction algorithm was used to extract from the chatlog dataset the frequency of each term in the gold standard $T_{GOLD}$ taxonomy.

Step 2. The taxonomy construction algorithm was applied using the term frequencies from step 1, varying the configuration (Table 3 of FIG. 7) and model to be evaluated.

The unit of analysis for our evaluation is each pair of concepts x and y where there is a relation x⊑y. Note that transitivity was not taken into consideration, therefore only direct connection between terms was considered. The results of each run were evaluated using link precision as described in Equation 14 below, where T is the resulting taxonomy provided by the taxonomy construction algorithm, and $T_{GOLD}$ is the taxonomy provided as the expected result.

$$\text{precision}(T, T_{GOLD}) = \frac{|\{(x \sqsubseteq y) \in T \wedge (x \sqsubseteq y) \in T_{GOLD}\}|}{|\{(x \sqsubseteq y) \in T\}|} \quad \text{EQUATION 14}$$

Results and Discussion

The problem of taxonomy construction is very challenging, and previous evaluations such as TexEval (see Bordea, G., supra) have only reported precision as high as 30%. One challenge is that the structure of multiple taxonomies in the same domain may vary considerably, therefore it is difficult to take advantage of the overall structure of one taxonomy when the best structure in another occasion may be completely different. Therefore, due to the multiple challenges in the automatic generation of a taxonomy structure (see Bordea, G., supra), a precision measure of 20% can already be considered as a strong result.

From the perspective of the logical connection between terms in the taxonomy, the best performing setting (Table 4 in FIG. 8) was the one using the Bhattacharyya-Poisson likelihood score function, greedy search strategy, and the in-domain model (using the products taxonomy as background knowledge). This setting consistently gave better results than all the others on the three taxonomies available. It is important to note, however, that only the sectors and topics taxonomies were used as gold standard since the products taxonomy was the one used as training data. The results using the products taxonomy are displayed only to contrast the impact of using an in-domain taxonomy versus using an out-of-domain one to train the pairwise scoring model. In fact, the results suggest that the choice of likelihood score and search method have a higher contribution to the quality of the final taxonomy than the domain of the taxonomy used to train the pairwise scoring algorithm. Therefore, we infer that the taxonomy construction framework can be successfully applied to other customer service domains where there is no background taxonomy to train the pairwise scoring model.

In general, the pairwise scoring model is just one element that impacts on the final taxonomy built from text. In some cases its use provided better results and in some cases not. Overall, the choices of likelihood score function and search strategy had a higher impact on the quality of the final taxonomy than the taxonomy provided for pairwise scoring training. Nonetheless, the use of a domain taxonomy as background knowledge showed between 10% and 25% improvement in the precision when using the non-transitive score or BP functions with the greedy search.

Figure 9:
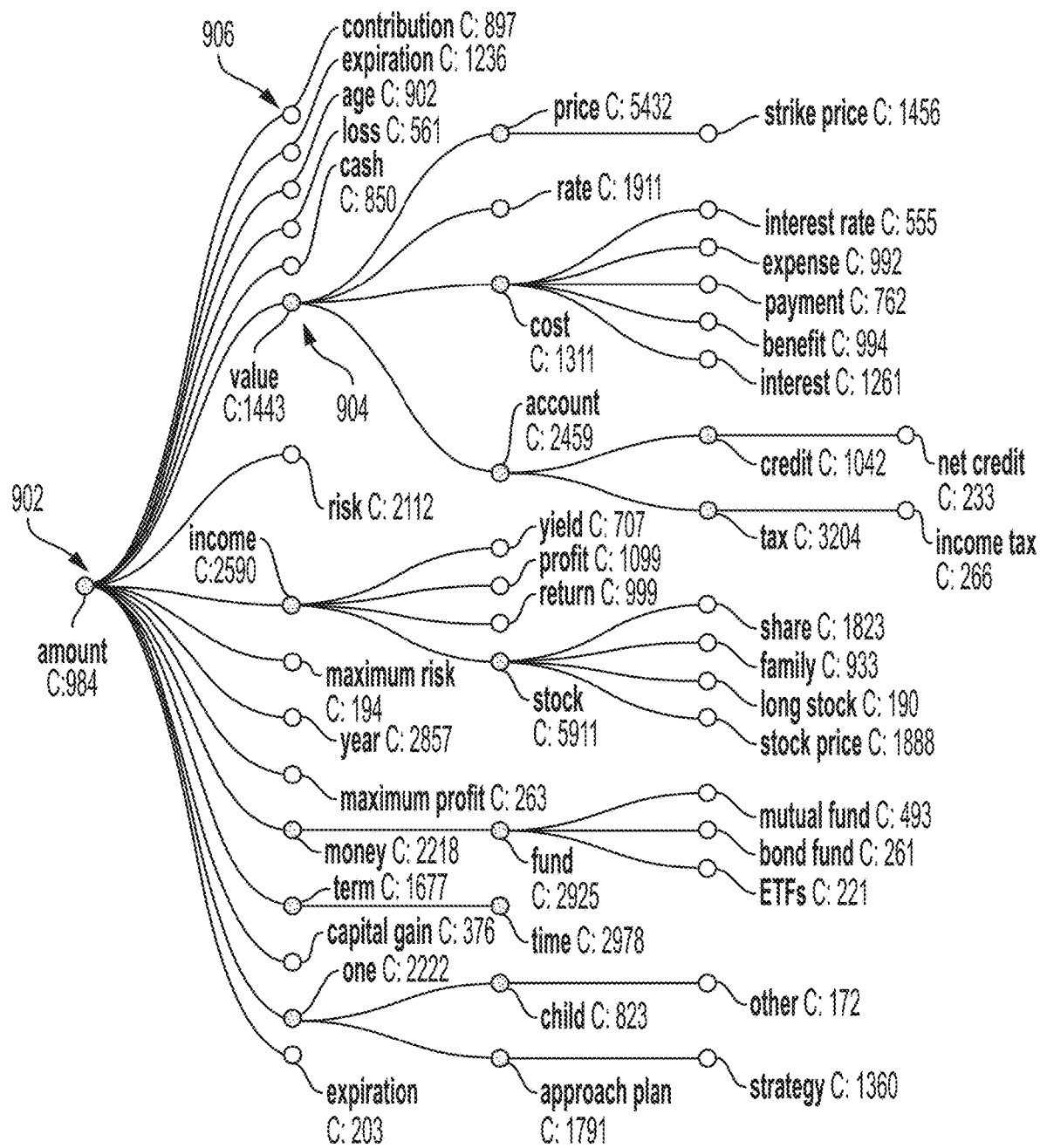
FIG. 9 is a diagram of an exemplary taxonomy data structure.

Finally, FIG. 9 depicts a portion of an exemplary taxonomy data structure. As shown in FIG. 9, the taxonomy data structure comprises a root node 902 (e.g., the term "amount") and a plurality of child nodes that are connected in a hierarchical fashion to the root node 902. In some cases, a child node can be the final node in a branch (e.g., the term "contribution" 904) or a child node can further have its own child nodes (e.g., the term "value" 906 has several children, including "price," "rate," "cost," and "account"). As can be appreciated, the system 100 can traverse the taxonomy data structure (either starting at the root 902 or at any of the child nodes) to discover concepts and terms that are related). For example, if a user message contains the term "amount," the system 100 can traverse the taxonomy data structure starting at node 902 to discover that there are many related terms, each of which may be associated with certain content that may have relevance to the user message. As described previously, the system 100 can capture the associated content for related terms and provide that to a user device in response to the message.

As described herein, there are advantageous methods and systems for the automatic extraction of taxonomies from customer service dialogue data and assessment of its performance on certain use cases. We evaluated multiple methods for automatic term recognition, where ComboBasic was the most suitable term scoring function for the dataset used. Also, we introduced multiple functions to evaluate the likelihood that a tree structure is a taxonomy and evaluated their efficacy in taxonomy extraction. Furthermore, our results suggest that our approach does not require the taxonomy used for training to be in the same domain of the business, which makes our solution applicable to customer service domains where a manually created taxonomy is not available, but the use of in-domain data can improve the result.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for building a knowledge base taxonomy from structured or unstructured computer text for use in automated user interactions, the system comprising:
   a server computing device comprising a memory for storing programmatic instructions and a processor that executes the programmatic instructions to:
      establish, by an automated conversational agent of the server computing device, a communication session with a client computing device;

capture one or more text segments corresponding to messages exchanged between the automated conversational agent and the client computing device in the communication session;

store the captured text segments in a database;

receive, by a taxonomy generation module of the server computing device, one or more of structured text or unstructured text corresponding to historical user interaction data, including the captured text segments, from the database;

extract, by the taxonomy generation module, terms from the received text that are most relevant to a subject matter domain;

organize, by the taxonomy generation module, the extracted terms into a taxonomy data structure;

provide, by the taxonomy generation module, the taxonomy data structure to the automated conversational agent;

generate, by the automated conversational agent, one or more responses, using the taxonomy data structure, to messages received from the client computing device.

2. The system of claim 1, wherein extracting terms from the received text that are most relevant to a subject matter domain comprises:

identifying candidate terms in the received text;

generating a score value for each of the identified candidate terms;

ranking the candidate terms according to the score values;

filtering the ranked candidate terms; and extracting the filtered candidate terms from the received text.

3. The system of claim 2, wherein identifying candidate terms in the received text comprises detecting a plurality of noun phrases in the received text that have one or more of the following characteristics: contain a minimum number of n-grams, contain a maximum number of n-grams, do not start with a stopword, do not end with a stopword, follow a part-of-speech pattern, and occur at least a minimum number of times within the received text.

4. The system of claim 2, wherein generating a score value for each of the identified candidate terms comprises applying one or more scoring functions to each identified candidate term, and aggregating a value from each applied scoring function to generate the score value.

5. The system of claim 4, wherein the one or more scoring functions comprise a frequency scoring function, a context scoring function, a reference corpus comparison function, a topic modelling function, or any combination thereof.

6. The system of claim 2, wherein ranking the candidate terms according to the score values comprises sorting the candidate terms from a highest score value to a lowest score value.

7. The system of claim 6, wherein when more than one scoring function is applied, the candidate terms are sorted according to a voting mechanism applied to each scoring function.

8. The system of claim 2, wherein filtering the ranked candidate terms comprises retaining a subset of the ranked candidate terms with score values at or above a predetermined threshold, and discarding the ranked candidate terms with score values below the predetermined threshold.

9. The system of claim 1, wherein organizing the extracted terms into a taxonomy data structure comprises:

identifying a plurality of pairs of terms in the extracted terms, wherein the terms in each pair of terms are different;

labelling each pair of terms based upon whether one term in the pair of terms corresponds to a narrower concept than the other term in the pair of terms; and generating the taxonomy data structure using the labelled pairs of terms based upon the label applied to each pair of terms.

10. The system of claim 9, wherein labelling each pair of terms based upon whether one term in the pair of terms corresponds to a narrower concept than the other term in the pair of terms comprises:

generating a multidimensional feature vector corresponding to each pair of terms, training a classification model using a historical taxonomy data structure associated with the same subject matter domain as the received text;

executing the trained classification model using the multidimensional feature vectors as input to generate a label for each multidimensional feature vector, wherein the label corresponds to a probability estimation that one term in the pair of terms corresponds to a narrower concept than the other term in the pair of terms.

11. The system of claim 10, wherein the features in the multidimensional feature vector comprise string-based features of the pair of terms, frequency-based features of the pair of terms, word embedding features of the pair of terms, and lexical features of the pair of terms.

12. The system of claim 10, wherein the classification model is a Support Vector Machine (SVM) classifier.

13. The system of claim 9, wherein generating the taxonomy data structure using the plurality of pairs of terms based upon the label applied to each pair of terms comprises:

building a candidate taxonomy data structure using each pair of terms based upon the label applied to the pair of terms;

selecting a taxonomy likelihood score function for the candidate taxonomy data structure; and generating a taxonomy data structure using each pair of terms, that optimizes a score of the selected taxonomy likelihood score function.

14. The system of claim 13, wherein the taxonomy likelihood score function comprises a transitive likelihood score function, a non-transitive likelihood score function, or a Bhattacharyya-Poisson likelihood score function.

15. The system of claim 13, wherein generating the taxonomy data structure using each pair of terms comprises executing a greedy search using each pair of terms to optimize the score of the selected taxonomy likelihood score function.

16. The system of claim 13, wherein generating the taxonomy data structure using each pair of terms comprises executing a beam search using each pair of terms to optimize the score of the selected taxonomy likelihood score function.

17. The system of claim 1, wherein generating one or more responses, using the taxonomy data structure, to messages received from the client computing device comprises:

identifying one or more terms from a message received from the client computing device;

traversing the taxonomy data structure to identify one of the one or more terms from the message and discover one or more logical connections between the identified term and one or more other terms; and generating a response to the message based upon the one or more logical connections between the identified term and the one or more other terms.

18. The system of claim 17, wherein generating a response to the message based upon the one or more logical connections between the identified term and the one or more other terms comprises retrieving one or more resources to include in the generated response, wherein the retrieved one or more resources relate to at least one of the one or more other terms.

19. The system of claim 18, wherein the retrieved resources include a URL, a digital document, a link to a digital document, or a text segment.

20. The system of claim 1, wherein the taxonomy data structure is a tree structure with the extracted terms as nodes of the tree structure and logical relationships between the extracted terms as edges of the tree structure.

21. A computerized method of building a knowledge base taxonomy from structured or unstructured computer text for use in automated user interactions, the method comprising:

establishing, by an automated conversational agent of a server computing device, a communication session with a client computing device;

capturing, by the automated conversational agent, one or more text segments corresponding to messages exchanged between the automated conversational agent and the client computing device in the communication session;

storing, by the automated conversational agent, the captured text segments in a database;

receiving, by a taxonomy generation module of the server computing device, one or more of structured text or unstructured text corresponding to historical user interaction data, including the captured text segments, from the database;

extracting, by the taxonomy generation module, terms from the received text that are most relevant to a subject matter domain;

organizing, by the taxonomy generation module, the extracted terms into a taxonomy data structure;

providing, by the taxonomy generation module, the taxonomy data structure to the automated conversational agent;

generating, by the automated conversational agent, one or more responses, using the taxonomy data structure, to messages received from the client computing device.

\* \* \* \* \*